UNITED STATES PATENT OFFICE.

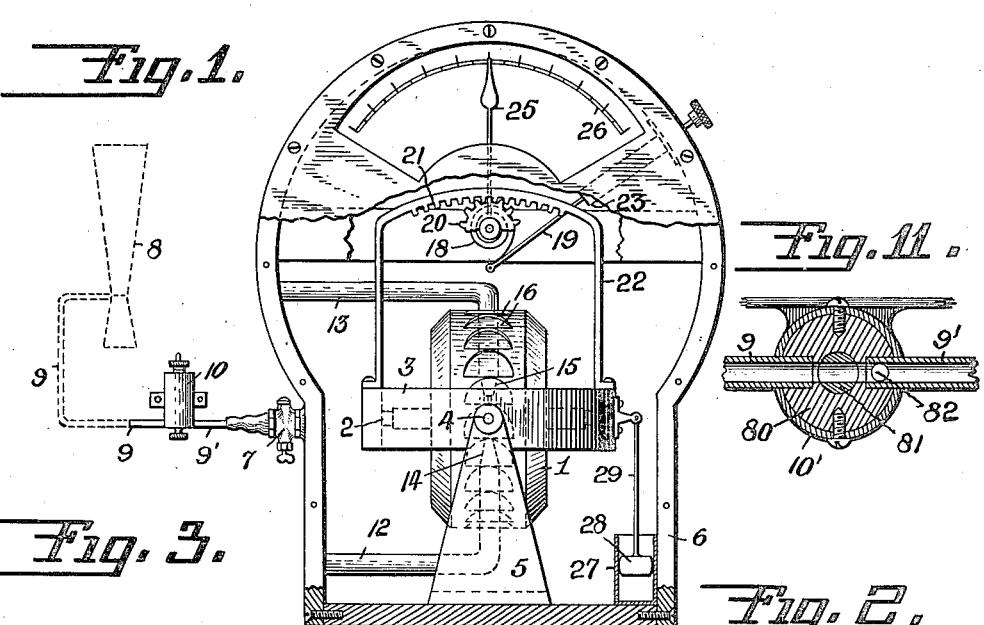
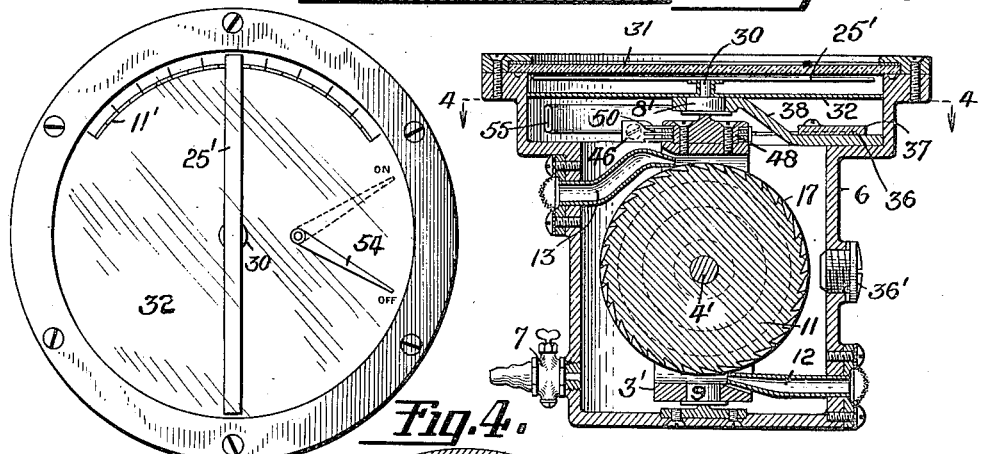
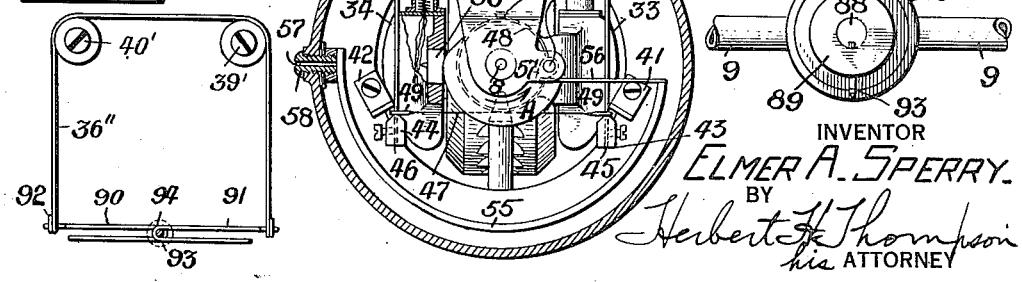

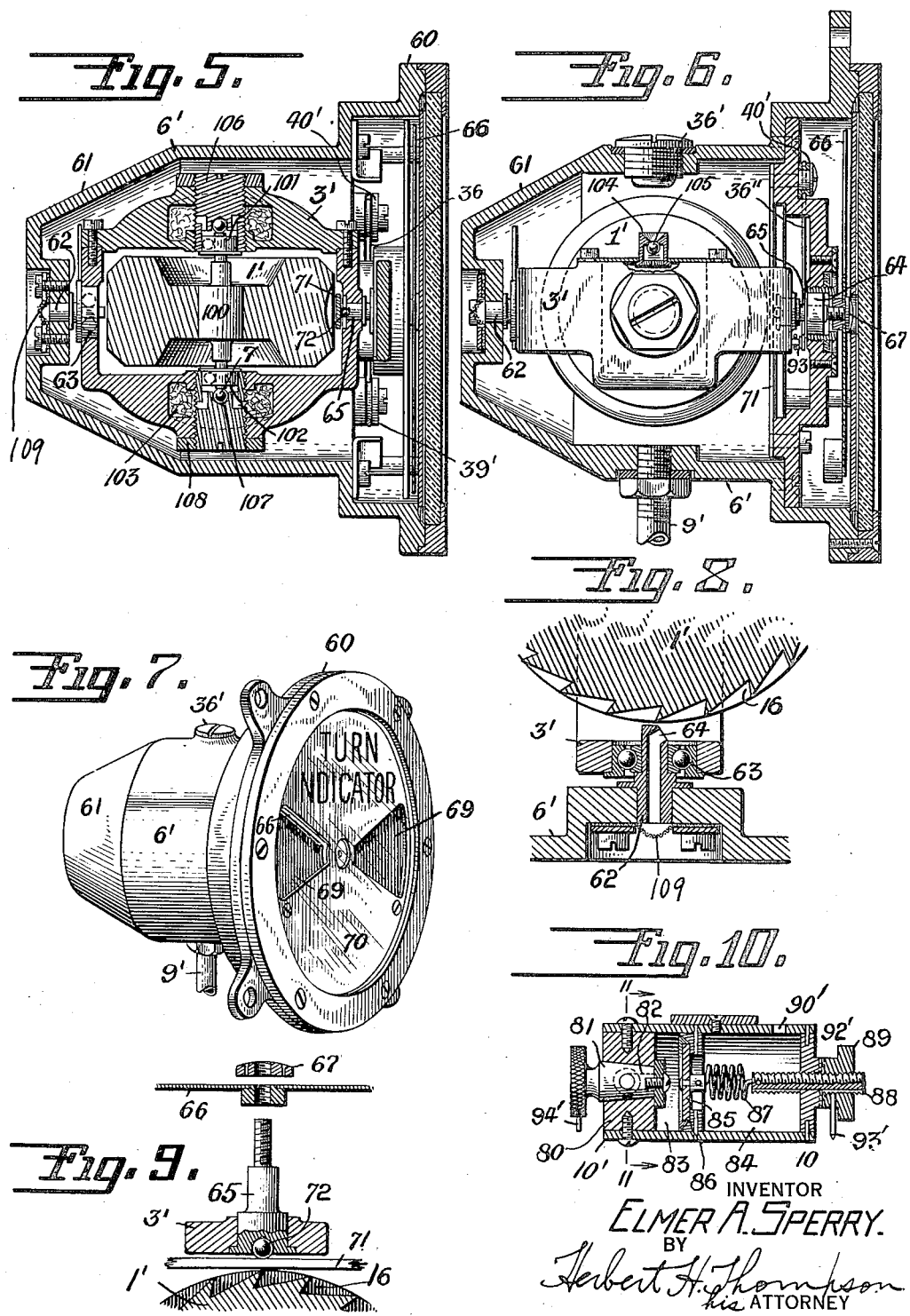

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

TURN INDICATOR.

1,407,491.  Specification of Letters Patent.  Patented Feb. 21, 1922.

Application filed January 24, 1920. Serial No. 353,739.

*To all whom it may concern:*

Be it known that I, ELMER A. SPERRY, a citizen of the United States of America, residing at 1505 Albemarle Road, Brooklyn, in the county of Kings and State of New York, have invented certain new and useful Improvements in Turn Indicators, of which the following is a specification.

This invention relates to turn indicators especially adapted for aircraft, but also has applicability to other forms of dirigible vehicles such as ships (both surface and submarine). In navigating aircraft especial difficulty is experienced by aviators in maintaining a straight course since slight deviations from the course frequently occur which are ordinarily unnoticed and frequently not indicated by the compass until after the deviation has taken place, due to the friction of the needle support and other causes. This difficulty becomes most troublesome when flying in fog or clouds.

The object of this invention is to devise a very simple form of indicator to show the aviator instantly when the airplane turns from the straight course and the direction of turn. For this purpose I use a novel form of gyroscope so mounted as to be influenced by the slightest angular acceleration of the craft so as to indicate the angular acceleration immediately in both direction and amount.

This application contains subject matter and claims divided from my copending application on "Indicators for aircraft", Serial No. 257,776, filed October 11, 1918, and is a continuation of the aforesaid application to the extent of the matters common to the two applications.

Referring to the drawings in which what I now consider to be the preferred forms of my invention are shown:

Fig. 1 is an elevation with parts broken away showing one form of the gyroscopic apparatus embodying the invention.

Fig. 2 is a vertical sectional view of another gyroscopic embodiment of the invention.

Fig. 3 is a front elevation of the indicator of the same.

Fig. 4 is a transverse section on line 4—4 of Fig. 2.

Fig. 5 is a longitudinal section of a preferred form of turn indicator.

Fig. 6 is a horizontal section of the same with parts in elevation.

Fig. 7 is a perspective view of a complete turn indicator.

Fig. 8 is a detail showing the driving jet.

Fig. 9 is a detail showing one bearing of the gyroscope.

Fig. 10 is a sectional view of the speed control device.

Fig. 11 is a section on line 11—11 of Fig. 10.

Fig. 12 is a rear elevation of the device shown in Fig. 10.

Fig. 13 is a detail view of the means for centralizing the gyroscope in the turn indicator of Figs. 5 and 6.

The gyroscope shown in Fig. 1 comprises the usual elements composing a rotor 1 journaled for rotation on the horizontal spinning axis 2 in the ring or rotor bearing frame 3. Said ring in turn is journaled for oscillation about a second horizontal axis 4 and brackets 5 supported in the enclosing casing 6. The axis 4 about which rotor bearing frame 3 turns is preferably placed fore and aft of the craft on which it is mounted so that precession about said axis will be instantly produced by turning the craft in azimuth. The gyroscope is preferably air driven. For this purpose the entire apparatus is shown as enclosed within the casing 6 which is made air-tight and through which air is drawn by creating differential pressure without and within the casing. Preferably the air is exhausted from the casing through valve 7 by any suitable means, but it is obvious that positive instead of negative air pressure may be used to drive the rotor if desired. Preferably means responsive to the passage of the airplane through the air is employed so that no machinery is needed for this purpose. A convenient means for this purpose is a Venturi tube 8 mounted on the airplane so as to receive the maximum velocity of the air. Said tube is preferably mounted in the slipstream of the propeller of the aircraft, with the longitudinal axis of the tube parallel to said slip-stream, whereby air can be drawn through casing 6 at a maximum rate.

In Fig. 1 the tube is shown as rotated upwardly through 90° so as to illustrate the same. The tube 9 is shown as leading from the restricted portion of the Venturi tube 8 to the gyroscope. Preferably a speed governing means or pressure regulating means, which is hereinafter described in detail, is enclosed in the tube. Also valve 7 may be used to start and stop the gyroscope and also for the purpose of regulating the speed of the same if desired, by adjusting the amount of opening of the valve 7. One or more tubes 12 and 13 lead from the exterior of the casing to nozzles 14 and 15 adjacent the axis 4 of the gyroscope. Suitable impinging surfaces or blades are provided for the jets to act on. Said means preferably consists of buckets or blades 16 cut or otherwise formed in the periphery of the rotor itself. Said buckets are preferably formed with a curved and undercut forward surface 17 in order that a continuous impulse may be exerted by the jets irrespective of the turning of the gyroscope about the axis 4. With straight blades, such as have heretofore been proposed, we find when the gyroscope becomes inclined about said axis that a large part of the air is spilled off the buckets thus wasting energy and also an undesirable torque is exerted on the gyroscope.

In order to centralize the gyroscope, in other words in order to turn it to normal position after the airplane resumes a straight course, spring means 18 may be employed. As shown in Fig. 1 the spring is in the form of a spiral spring one end of which is secured to an adjustable rod 19 and the other end secured to a pinion 20 journaled in the frame 6. Said pinion is shown as meshing with an internal segmental gear 21 on a frame 22 mounted on the ring 3 of the gyroscope. The rod 19 is frictionally and slidably mounted in a sleeve 23 so that the position of the rod may be varied to alter the centralized position of the spring. A pointer 25 or other suitable indicating means is shown as secured to the shaft. A scale 26 on the casing 6 is shown on which the pointer is adapted to be read.

Preferably a damping means is provided on the gyroscope, such means being shown in the form of a dash pot 27 on which is mounted a piston 28 connected by link 29 to the ring 3.

Since an airplane banks when it turns, the influence exerted by spring 18 or in other words its centralized position will change slightly. The gyroscope will precess at the same time, however, due to the turning so that this effect is practically negligible, if a not too strong spring is used. The direction of rotation of the gyroscope may be such as to cause the precession to be in the direction of the increased spring tension so as to magnify and increase its sensitiveness, or in the opposite direction for the opposite purpose. By properly designing the spring, all precession may be overcome and the gyro remain vertical, if desired, as pointed out in my application above referred to.

In Figs. 2 to 4, a slightly different form of gyroscope is shown. In these figures, rotor 11 is again mounted on horizontal spinning axis 4' within the ring 3'. In this case, however, the pointer 25' is secured directly to a prolongation 30 of the shaft 8' extending from ring 3'. The pointer is readable through a glass cover 31. A scale 11' may be provided upon the plate 32 under the pointer upon which to read the pointer.

Large oil cups 33 and 34 are provided for each end of the shaft 35 of the gyroscope, said cups also serving as stops to prevent oscillation of the gyroscope about axis 4 beyond a predetermined point by striking the set screw 36' in casing 6' of the gyroscope.

The yielding centralizing means for the gyroscope shown in this instance is a U-shaped spring 36, clamped between plates 37 and 38. Said spring is bent around posts 39 and 40, its free ends 45 and 46 extending downwardly on either side of the rotor as shown in Fig. 4. Said ends press outwardly against adjustable stops 41 and 42 and also have secured thereto knobs or other enlargements 43 and 44. Over the end 45 is placed a ring or loop 49 having a cord or thread 47 secured thereto. Said thread extends around a drum 48 secured to the ring 3' of the gyroscope and thence to a similar ring 49' engaging the other end 46 of the spring. The enlargements 43, 44 serve merely to prevent the rings 49 and 49' from dropping off the end of the springs. A spiral groove 50 is preferably provided on the drum for the thread 47. It will readily be seen that if the gyroscope should precess in the direction of the arrow A, for instance, the cord 47 will be wound so as to draw the end 46 of the spring to the right in Fig. 4, while the end 45 of the spring will be ineffective. This, it will be seen, will bring into action a yielding centralizing means to exert a force on the gyroscope about the axis 8—9 similarly to the spring 18.

The strength of the spring 36 and also the relative stiffness of the two ends 45 and 46 may be adjusted by inserting a pin or pins 52 and 53 in holes 52' and 53' in the casing so as to shorten either one, or both of the free ends of the spring.

A second pointer 54 may also be provided to indicate to the observer whether or not the gyroscope is operating. For actuating this pointer a curved flat tube 55 is provided which is secured to casing 6 at one end and adjacent the other end to a bar or link 56. Said link is connected to an arm 57 secured to the shaft 58 of the pointer 54. The flat tubing 55 is sealed at its inner end and at its outer end is in communication with outside air through an aperture 57 in screw 58 to which the last mentioned end of the tube is soldered or otherwise secured.

It will readily be seen that the curved thin walls of the tubing will tend to straighten out or expand as the air is exhausted from the casing 1′, since that action will effect a relative increase in pressure in the air within the tubing. This it will be seen will cause a rotation of the arm 57 in a clockwise direction, thereby rotating the pointer 54 from the off position of Fig. 3 to the on or dotted line position.

In this modification, the thread and spring connection not only serves to centralize the gyroscope, but also damps the oscillations since the thread or cord fits rather snugly in the groove 50. In order to prevent slipping the thread may also be looped around a post 90.

The preferred form of turn indicator, as shown in Figs. 5 to 9, closely resembles in many respects the form shown in Figs. 2 to 4. In this form also a casing 6′ of general cylindrical form is employed having an enlarged forward portion 60 and a tapered rearward portion 61. The air is withdrawn from the casing 6′ as in the other forms of the invention, through pipe 9′, which is as shown preferably located at or near the bottom of the casing 6′, so that if any water or oil gets into the casing it will be at once removed. Supported within said casing, substantially on the longitudinal axis thereof is the frame 3′ containing the bearings for the rotor 1′. Said frame, as stated, is journaled at the rear on a trunnion 62 secured in the casing, the frame being journaled on ball bearing 63 on said trunnion (see Fig. 8). The rotor 1′ is shown as frictionally secured to the shaft 100 which is mounted for rotation in ball bearings 101 and 102 at either end. Oil is supplied to the bearings from oil cups 103 which may be filled with waste, said oil being introduced through oil hole 104, normally closed by a small spring pressed ball 105. End play in the rotor is preferably provided for by adjustable set screws 106 in each end of the journal frame 3′. Preferably a ball 107 is placed between each end of the shaft and the set screw to reduce friction, which set screw is locked in place by means of lock nut 108. By this means variations in the expansion of the frame to changed temperatures, etc., is taken up by adjusting the set screws, thereby avoiding sticking in the bearings on the one hand and preventing end play on the other hand. Preferably the trunnion 62 is tubular or hollow and equipped at its inner end with a suitably directed nozzle 64 so that air being drawn through said trunnion will impinge the buckets 16 on the gyroscope and rotate the same. A screen or cloth to filter the air entering the tube may be provided at its outer end as shown at 109. By this means the jet is introduced exactly at the axis of the frame and cumbersome tubes within the casing are eliminated. At the forward end the frame 3′ is journaled within bearing 64, the frame having the trunnion 65 secured thereto extending through the bearing. Said trunnion or pin is threaded at its outer end and has secured thereto a suitable form of pointer or indicator 66 by means of lock nut 67. The indicator is shown as made in the form of a circular plate having a pair of segmental openings therein normally adapted to register with corresponding openings 69 in the top plate 70. When the gyroscope precesses, however, the solid portion of the plate comes into view of the aviator on one side or the other and indicates at once which way the airplane is turning. End play may be eliminated in the bearings of the ring 3′ by means such as a transversely extending plate 71 against which ball 72 mounted on the inside of the ring 3′ is adapted to rest. The gyroscope may be centralized by means similar to that shown in Fig. 4. For this purpose a U-shaped spring 36″ is employed as in Fig. 4; but the thread is replaced by a pair of U-shaped rods or "hair pins" 91, 91′ each connected at its outer end to one end of spring 36″ by eyes 92 and loosely hooked around pin 93 at their bends 94 in the middle portions.

In all forms of the invention preferably some means, as stated, are employed to regulate the speed of the gyroscope and to render it controllable at the will of the operator. In the simplest form the speed regulating means may consist simply of the valve 7 which the operator can adjust at will. The adjustment of said valve, however, will not maintain the speed of the gyroscope constant for varying speeds of the airplane, but will require adjustment when the airplane's speed changes. I prefer therefore to employ a more automatic means for maintaining the speed constant, irrespective of changes in the speed of the airplane. The purpose of this will readily become apparent when the laws of the gyroscope are considered. With a centralizing spring of given strength and the gyroscope rotating at a given speed, the gyroscope will always precess to the same point for a given rate of turn of the aircraft and hence the amount of the indicator 66 showing will indicate with accuracy the rate of turn as well and its direction, i. e., the sign and amount of the angular acceleration. If, however, the speed of rotation of the gyroscope varies materially, a third undetermined variable is introduced which affects the amount of precession for a given rate of turn. A simple means for accomplishing automatically what may roughly be effected through hand regulation is indicated at 10 in Fig. 10, said means being placed in the pipe line 9 connecting the Venturi tube 8 with the gyro casing. A small cylindrical casing 10' has provided at one end a detachable block 80 having a cock 81 therein. When turned transversely a straight passageway leads from the pipe 9 to the pipe 9', as indicated in Fig. 11. By turning the cock, however, communication between the two pipes may be closed. Into one of tubes 9' leads a small opening 82 comunicating with interior compartment 83 of the cylinder 10'. Compartment 83 is normally shut off from compartment 84 by means of valve 85 seating upon the valve seat 86 and normally held thereagainst by means of spring 87. The tension of said spring is adjustable at will having the outer end thereof connected to a rod 88 upon which a thumb nut 89 is threaded. By turning said nut it will be readily apparent that the screw 88 may be advanced and retracted at will and thereby the tension of spring 87 varied. A small opening 90' is provided in the wall of the compartment 84. The nut 89 is held in any desired position by friction with the top of the cylinder which may be increased by serrations on the adjacent surfaces of the cylinder, as at 92'. Suitable indicators 93' and 94' may be provided on both the nut and turn cock 81.

The operation of the speed governing device is as follows: When the airplane is moving slowly the air is extracted from the casing at a correspondingly slow rate. In other words the negative pressure is not great and, therefore, the valve 85 remains closed. When, however, the speed becomes greater, the negative pressure in the tube 9 becomes greater until the difference in pressure on the two sides of the valve 85 is sufficient to force the valve open against the action of the spring 87. This will cause the flow of air into the opening 90', compartment 84, valve 85, compartment 83, and opening 82 into the pipe line 9 so as to reduce the rate of exhaust from the casing 6. By adjusting the nut 89 any ordinarily desired limit of the rate of exhaust and, therefore, the speed of the gyroscope, may be obtained whereby the aviator may virtually rotate the gyroscope at any desired speed. This becomes very important since no two gyroscopes are exactly alike, each possessing its own peculiar point of maximum efficiency at which it is neither too sensitive nor too sluggish. By providing a means of this character the aviator may adjust the instrument to secure maximum efficiency or at least to suit his own individual preference. By altering the speed of rotation, adjustment of the tension of the centralizing spring becomes unnecessary.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention what I claim and desire to secure by Letters Patent is:

1. A gyroscopic turn indicator comprising a closed casing, a gyroscope comprising a rotor and means for mounting same in said casing for precession about an axis, means for drawing air through the casing when the casing is moved relatively to the air, means for causing said drawing of air through the casing to rotate said rotor, and an indicator connected with said gyroscope for showing precession of the gyroscope away from its normal position.

2. A gyroscopic turn indicator for aircraft, comprising the combination with an aircraft, of a closed casing mounted thereon, a gyroscopic rotor mounted therein for precession about an axis, means for drawing air through said casing when the aircraft is moving through the air, a tube extending from without the casing to a point adjacent the rotor near said axis, and means for indicating deviation of said gyroscope from its normal position about said axis.

3. A gyroscopic turn indicator for dirigible craft comprising a support, a rotor bearing frame pivotally mounted therein, a rotor journaled in said frame, a spring, and a flexible friction producing member connecting said spring and frame, to both damp oscillations of the frame about its pivotal axis and centralize said frame with respect to said support.

4. A gyroscopic turn indicator for dirigible craft comprising a support, a rotor bearing frame pivotally mounted therein, a rotor journaled therein, and a U-shaped spring having the central portion thereof secured to said support and each leg connected to the frame to oppose tilting of said frame.

5. A gyroscopic turn indicator for dirigible craft, comprising a closed casing, a gyroscopic rotor mounted therein for precession about an axis, means for drawing air through said casing, a passageway leading from without the casing along said axis, and a nozzle connected therewith adjacent said rotor for directing air to drive said rotor.

6. The combination with an aircraft, of a gyroscopic indicator thereon adapted to be driven by a blast of air, a casing enclosing the same, means adjacent said gyroscope for directing air to drive the same, means for causing a flow of air through said air directing means by withdrawing air from said casing, and means whereby the rate of withdrawal of air from said casing may be adjusted at will.

7. A gyroscopic indicator for dirigible vehicles adapted to be driven by a blast of air, comprising a gyroscope, a casing enclosing the same, means adjacent said gyroscope for directing the air to drive the same, means for causing a flow of air through said air directing means by withdrawing air from said casing and means responsive to the pressure of the second named means for limiting the rate of air flow through said air directing means.

8. The combination with an aircraft, of a gyroscopic indicator thereon having a rotor adapted to be driven by a flow of air, a nozzle adjacent said rotor for directing air to drive said rotor, a casing enclosing said rotor, means for drawing air through said nozzle in response to the passage of the airplane through the air, and means for limiting the rate of exhaust for preventing the speed of rotation of said rotor from exceeding a certain limit regardless of the speed of the airplane through the air.

9. A gyroscopic turn indicator for dirigible craft, comprising a closed casing, a gyroscopic rotor mounted therein for precession about an axis, means for drawing air through said casing, a passageway leading from without the casing along said axis, a nozzle connected therewith adjacent said rotor for directing air to drive said rotor, and indicating means connected to be actuated by precession about said axis.

10. In a turn indicator, a casing, a frame journaled on pivots adjacent the two ends of said casing at least one of said pivots being hollow, resilient means for centralizing the frame with respect to said casing, a rotor journaled in said frame on a transverse axis, a nozzle in communication with said hollow pivot to direct a current of air for driving the rotor, and an indicator connecting to one of said pivots.

11. In a turn indicator, a closed casing, a frame journaled on pivots adjacent the two ends of said casing at least one of said pivots being hollow, resilient means for centralizing the frame with respect to said casing, a rotor journaled in said frame on a transverse axis, a nozzle in communication with said hollow pivot to direct a current of air for driving the rotor, an indicator connected to one of said pivots, and means for withdrawing air from said casing.

12. In a turn indicator for aircraft, comprising the combination with an aircraft of a gyroscope, means for mounting the same for precession about an axis normally at an angle to the vertical, means for causing the flight of the aircraft to rotate the gyroscope and yielding centralizing means for the gyroscope.

13. In a turn indicator for aircraft, the combination with an aircraft, of a gyroscope adapted to be air driven, means for mounting the same thereon for precession about an axis normally at an angle to the vertical, means for rotating the gyroscope when the aircraft is in motion with respect to the atmosphere, yielding means for opposing said precession, and an indicator connected with said gyroscope for indicating when said gyroscope precesses.

14. In a gyroscopic indicator for dirigible vehicles, the combination with a vehicle, of a gyroscope, means for mounting same thereon for precession about an axis normally at an angle to the vertical, means for causing the movement of the vehicle to rotate the gyroscope, and means for opposing the precession of the gyroscope.

15. In a gyroscopic turn indicator for dirigible vehicles, a gyroscope, means for mounting same for precession about an axis normally at an angle to the vertical, means for driving the gyroscope with the medium through which the vehicle travels, yielding means for opposing precession of the gyroscope, and means connected with the gyroscope for indicating the direction and rate of turn of the vehicle.

16. In a turn indicator for dirigible craft, a gyroscope, means for mounting same for precession about an axis normally at an angle to the vertical, yielding means for opposing said precession, means for damping the oscillations of said gyroscope about said axis, and an indicator connected with said gyroscope for indicating when the latter precesses.

17. In a turn indicator for dirigible craft, a gyroscope mounted for precession about an axis at an angle to the vertical, yielding means for opposing said precession, means for driving the gyroscope, adjustable means for varying the relative strength of the gyroscopic effort and said opposing means, and means connected with the gyroscope for indicating when the aircraft turns and approximating the rate of turn.

18. In a turn indicator for aircraft, the combination with an aircraft, of a gyroscope mounted thereon for precession about an axis normally at an angle to the vertical, yielding means for opposing said precession, means for causing the movement of the craft through the air to rotate the gyroscope, means whereby the speed of rotation of the gyroscope may be adjusted at will, and means connected with the gyroscope for indicating when the latter precesses.

19. A gyroscopic turn indicator for dirigible craft comprising a support, a rotor bearing frame pivotally mounted therein, a rotor journalled in said frame, a spring, a flexible friction producing member connecting said spring and frame to both damp the oscillations of the frame about its pivotal axis and centralize said frame with respect to the support, and an indicator connected with said frame for indicating when the gyroscope precesses.

20. A gyroscopic turn indicator for aircraft comprising a support, a rotor bearing frame pivotally mounted therein, a rotor journalled in said frame, a U-shaped spring having the central portion thereof secured to said support and each leg connected to said frame to oppose tilting of the frame, and an indicator connected with said frame for indicating when the gyroscope precesses.

21. In a turn indicator for dirigible craft, a gyroscope, means for mounting the same for precession upon turning of the craft, an indicator connected with said gyroscope for indicating precession of the latter, means for rendering said indicator invisible when the gyroscope is in its normal position and for rendering said indicator visible when the gyroscope moves from its normal position.

22. In a turn indicator for dirigible craft, a gyroscope, means for mounting the same for precession upon turning of the craft, a plate having an opening therein, an indicator having an opening which normally registers with the opening in said plate, means connecting said gyroscope and indicator whereby the latter becomes visible through said first named opening when the gyroscope precesses.

23. In a turn indicator for dirigible craft, a gyroscope mounted for precession about an axis at an angle to the vertical, and restrained against precession about a vertical axis, a resilient member connected with said gyroscope for opposing precession thereof about said first named axis in either of opposite directions and an indicator actuated by precession of said gyroscope for showing the direction and rate of turn.

24. In a turn indicator for aircraft, the combination with an aircraft, of a gyroscope adapted to be air driven, means for mounting the same thereon for procession about an axis nomally at an angle to the vertical, yielding means for opposing said precession, means for driving said gyroscope in response to the flight of said aircraft, and means for varying the relative strength of the gyroscopic effort and said opposing means.

25. In a turn indicator for aircraft, the combination with an aircraft, of a gyroscope adapted to be air driven, means for mounting the same thereon for precession about an axis normally at an angle to the vertical, yielding means for opposing said precession, means for causing the movement of the craft through the air to rotate said gyroscope, and means whereby the speed of rotation of said gyroscope may be adjusted at will.

26. In a turn indicator for dirigible craft, a gyroscope mounted for precession about an axis, means for directing air to drive said gyroscope, curved blades on the periphery of said gyroscope against which the air from said means is adapted to strike, and means for causing a flow of air through said air-directing means.

27. In a turn indicator for dirigible craft, a casing, a gyroscope mounted therein for precession about an axis, means for directing air to drive said gyroscope, curved blades on the periphery of said gyroscope against which the air from said means is adapted to strike, means for causing a flow of air through said air-directing means, and means for indicating when the pressure in said casing is lowered.

28. In a turn indicator for dirigible craft, a casing, a gyroscope mounted in said casing for precession in response to turning of the craft, means for drawing a current of air through said casing, means for directing said current of air to drive said gyroscope, an indicator for showing precession of said gyroscope, a second indicator, an expansible tube, and means connecting said expansible tube and said indicator for showing the extent to which the pressure within said casing is lowered.

29. A gyroscopic turn indicator for dirigible craft comprising a support, a rotor bearing frame pivotally mounted therein, a rotor journaled in said frame, a U-shaped spring member having its central portion secured to said support, a projection on said frame, and U-shaped rods connected at their outer ends to the ends of said spring member and having their middle portions hooked around said projection.

30. In gyroscopic apparatus for aircraft, the combination with the aircraft, of a gyroscope mounted thereon for precession about an axis, means for causing rotation of the gyroscope in response to movement of the aircraft through the air, and means for preventing the speed of rotation of said gyroscope from exceeding a certain limit regardless of the speed of the aircraft through the air 31. In a gyroscopic turn indicator for moving vehicles, the combination with a nozzle, of a gyro-rotor mounted for precession with respect to said nozzle and having blades against which a jet from the nozzle is adapted to strike, said blades each having a straight edge and a curved edge opposite said straight edge.

32. In a gyroscopic turn indicator for moving vehicles, a nozzle, of a gyro-rotor mounted for precession with respect to said nozzle and having blades against which a jet from the nozzle is adapted to strike, each of said blades comprising a bottom portion inclined with respect to the periphery of the rotor and further comprising a straight edge extending transversely of the rotor and a curved edge opposite said straight edge and adapted to receive a jet of fluid from said nozzle.

33. In gyroscopic apparatus for aircraft, the combination with an aircraft, of a gyroscope mounted thereon for precession about an axis, means for causing rotation of the gyroscope in response to movement of the aircraft through the air, means for preventing the speed of rotation of said gyroscope from exceeding a certain limit regardless of the speed of the dirigible craft, and means for varying said limit at will.

34. In a turn indicator for aircraft, a casing, a frame mounted in said casing for pivotal movement about an axis, a gyro-rotor mounted in said frame for rotation about another axis, means for drawing air through said casing, blades on the periphery of said rotor, and means for directing air upon said blades at a point substantially on the first-mentioned axis.

35. In an air driven turn indicator, a substantially cylindrical casing, a frame, means for pivotally mounting the same therein on substantially the longitudinal axis thereof, a gyro-rotor mounted in said frame for rotation about an axis transverse of the casing, blades on the periphery of the rotor, means for directing a jet of air upon said blades, and an indicator at one end of said casing and actuated by the turning of same frame in the casing.

36. In an air driven turn indicator, a substantially cylindrical casing, a frame, means for pivotally mounting the same therein on substantially the longitudinal axis thereof, a gyro-rotor mounted in said frame for rotation about an axis transverse of the casing, blades on the periphery of the rotor, a nozzle at one end of the casing for driving the rotor, and an indicator at the opposite end of said casing actuated by the turning of said frame in the casing.

37. In an air driven turn indicator, a substantially cylindrical closed casing, a frame, means for pivotally mounting the same therein on substantially the longitudinal axis thereof, a gyro-rotor mounted in said frame for rotation about an axis transverse of the casing, blades on the periphery of the rotor, said casing having an aperture therein adjacent the bottom thereof, through which air may be withdrawn, a nozzle for directing the incoming air on to said blades, and an indicator visible from without the casing for showing the position of said frame within said casing.

38. A gyroscopic turn indicator comprising a casing, a gyro-rotor, a frame rotatably supporting said rotor, pivotal mountings for said frame in said casing, blades on said rotor for driving the same, a nozzle adjacent a pivotal mounting of said frame for driving the rotor, an indicator adjacent one of the pivotal mountings of said frame and means for extracting air from said casing.

39. A gyroscopic turn indicator comprising a casing, a gyro-rotor, a frame rotatably supporting said rotor, pivotal mountings for said frame in said casing, blades on said rotor for driving the same, a nozzle for driving the rotor, resilient means acting between the casing and frame for centralizing the latter, and an indicator actuated by turning of the frame in the casing away from its centralized position.

40. A gyroscopic turn indicator comprising a casing, a gyro-rotor, a frame rotatably supporting said rotor, pivotal mountings for said frame in said casing, blades on said rotor for driving the same, a nozzle for driving the rotor, resilient means acting between the casing and frame for centralizing the latter, and means whereby the tension of said means may be adjusted.

41. A gyroscopic turn indicator for dirigible craft comprising a casing, a frame pivotally mounted therein for oscillation about an axis, a gyroscopic rotor rotatably mounted in said frame, a passageway leading from a point without to within said casing along said pivotal axis, a nozzle connected therewith adjacent said rotor for directing air to drive said rotor, means for maintaining differential air pressure within said casing and without said casing, and indicating means connected to said frame for showing the position thereof within said casing.

42. In a turn indicator for aircraft, a casing, a frame mounted upon and within said casing for pivotal movement about an axis, a gyro-rotor mounted in said frame for rotation about another axis, means for withdrawing air from said casing, blades on the periphery of said rotor, and means for directing incoming air upon said blades at a point substantially on the first-mentioned axis.

In testimony whereof I have affixed my signature.

ELMER A. SPERRY.